(12) United States Patent
Kato et al.

(10) Patent No.: US 9,610,843 B2
(45) Date of Patent: Apr. 4, 2017

(54) ELECTRIC VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Shunya Kato, Seto (JP); Yosuke Tagawa, Toyota (JP); Hideki Furuta, Anjo (JP); Yoshiki Sawamura, Nagoya (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 0 days.

(21) Appl. No.: 14/744,504

(22) Filed: Jun. 19, 2015

(65) Prior Publication Data

US 2015/0372632 A1 Dec. 24, 2015

(30) Foreign Application Priority Data

Jun. 23, 2014 (JP) ................. 2014-128194

(51) Int. Cl.
*H02P 1/46* (2006.01)
*B60L 1/00* (2006.01)

(52) U.S. Cl.
CPC ............. *B60L 1/00* (2013.01); *Y02T 10/6239* (2013.01); *Y02T 10/7005* (2013.01); *Y02T 10/7275* (2013.01)

(58) Field of Classification Search
CPC . B60W 20/00; B60W 2710/083; B60W 20/30
See application file for complete search history.

(56) References Cited

U.S. PATENT DOCUMENTS

| | | | |
|---|---|---|---|
| 2004/0165868 A1 | 8/2004 | Sato et al. | |
| 2013/0246116 A1* | 9/2013 | Bank | G06Q 10/109 |
| | | | 705/7.19 |
| 2013/0296116 A1 | 11/2013 | Dai et al. | |

FOREIGN PATENT DOCUMENTS

| | | |
|---|---|---|
| JP | 3797361 | 7/2006 |
| WO | WO 03/015254 A1 | 2/2003 |

* cited by examiner

*Primary Examiner* — Karen Masih
(74) *Attorney, Agent, or Firm* — Finnegan, Henderson, Farabow, Garrett & Dunner, LLP

(57) ABSTRACT

An electric vehicle includes an electric motor, a transmission, a drive unit, a converter, and an electronic control unit. The transmission is provided in a power transmission path between a rotary shaft of the electric motor and drive wheels of the electric vehicle. The drive unit is configured to drive the electric motor. The converter is configured to regulate a voltage supplied to the drive unit. The electronic control unit is configured to control the converter, and determine the voltage regulated by the converter, based on a first quantity of state associated with torque of an output shaft of the transmission, and a second quantity of state associated with a rotational speed of the output shaft.

9 Claims, 9 Drawing Sheets

ELECTRIC VEHICLE

INCORPORATION BY REFERENCE

The disclosure of Japanese Patent Application No. 2014-128194 filed on Jun. 23, 2014 including the specification, drawings and abstract is incorporated herein by reference in its entirety.

BACKGROUND OF THE INVENTION

1. Field of the Invention

The invention relates to an electric vehicle, and in particular to an electric vehicle including a transmission, and a converter that regulates voltage supplied to a drive unit that drives an electric motor.

2. Description of Related Art

A motor drive control system including a motor, an inverter, and a converter that regulates the input voltage of the inverter is disclosed in International Publication No. 2003/015254. In the motor drive control system, the optimum voltage to be applied to the motor at the moment is calculated, based on the rotational speed and target output torque (torque command) of the motor, and a target value of the inverter input voltage is determined based on the optimum voltage to be applied. With the motor drive control system thus configured, the inverter input voltage can be optimized according to operating conditions of the motor, and the motor can be efficiently driven (see WO 03/015254 A1).

When a transmission is provided in a power transmission path between a rotary shaft of the electric motor and drive wheels, the operating point (rotational speed and torque) of the electric motor can rapidly change due to shifting (change of the speed ratio) of the transmission. In the motor drive control system described in WO 03/015254 A1, the target value of the inverter input voltage is determined based on the operating point of the electric motor; therefore, the inverter input voltage may not be able to follow rapid changes in the operating point of the electric motor. As a result, the electric motor may be temporarily unable to produce desired torque, and the driveability may deteriorate.

SUMMARY OF THE INVENTION (US, DE, CN)

In view of the problem as described above, the invention provides an electric vehicle that includes a transmission, a converter that regulates voltage supplied to a drive unit that drives an electric motor, and a controller, and is less likely or unlikely to suffer from deterioration of driveability due to rapid changes in the operating point of the electric motor.

According to one aspect of the invention, an electric vehicle includes an electric motor, a transmission, a drive unit, a converter, and an electronic control unit. The transmission is provided in a power transmission path between a rotary shaft of the electric motor and drive wheels of the electric vehicle. The drive unit is configured to drive the electric motor. The converter is configured to regulate a voltage supplied to the drive unit. The electronic control unit is configured to control the converter and determine the voltage regulated by the converter, based on a first quantity of state associated with torque of an output shaft of the transmission and a second quantity of state associated with a rotational speed of the output shaft.

According to the electric vehicle as described above, a target voltage of the converter is determined based on the first quantity of state associated with the torque of the output shaft of the transmission, and the second quantity of state associated with the rotational speed of the output shaft of the transmission. Therefore, rapid fluctuations in the voltage to be regulated (target voltage) due to rapid changes in the operating point of the electric motor are suppressed or reduced. Accordingly, with the electric vehicle configured as described above, the target voltage is stabilized, and, consequently, deterioration of the driveability can be curbed or reduced.

In the electric vehicle as described above, the electronic control unit may be configured to set the voltage regulated by the converter to a higher level as a value of the first quantity of state is larger.

Also, in the electric vehicle as described above, the electronic control unit may be configured to set the voltage regulated by the converter to a higher level as a value of the second quantity of state is larger.

With the electric vehicle configured as described above, torque shortage of the electric motor and/or the output shaft (drive shaft) of the transmission can be curbed, and deterioration of the driveability can be curbed or reduced.

Also, in the electric vehicle as described above, the electronic control unit may be configured to (i) determine a first voltage indicating a target value of the voltage, based on the first quantity of state and the second quantity of state, (ii) determine a second voltage indicating the target value, based on an operating point of the electric motor, (iii) determine a target voltage based on the first voltage and the second voltage, and (iv) control the converter such that the voltage becomes equal to the target voltage.

If the target voltage is determined based on only the first and second quantities of state associated with the output shaft of the transmission, the target voltage may be deviated from a voltage level at which an electric system consisting of the electric motor, drive unit and the converter operates efficiently, and the efficiency may be significantly reduced. However, according to the electric vehicle as described above, the second voltage is also taken into consideration in determination of the target voltage; therefore, the target voltage can also be determined in view of the efficiency of the electric system. Accordingly, it is possible to curb deterioration of the driveability, and also curb reduction of the efficiency of the electric system.

In the electric vehicle as described above, the electronic control unit may be configured to determine the target voltage so that the target voltage becomes closer to the first voltage as a running load of the electric vehicle is larger.

With the electric vehicle configured as described above, when the running load is large, the target voltage is determined with emphasis placed on the first and second quantities of state associated with the output shaft of the transmission, so as to meet the user request for running the vehicle at a high load. On the other hand, when the running load is small, the target voltage is determined with emphasis placed on the operating point of the electric motor, so that the electric system can be efficiently operated.

In the electric vehicle as described above, the electronic control unit may be configured as follows. Namely, the electronic control unit may be configured to (i) determine a first voltage indicating a target value of the voltage, based on the first quantity of state and the second quantity of state, (ii) determine a second voltage indicating the target value, based on an operating point of the electric motor, (iii) determine a third voltage indicating the target value, by giving predetermined weights to the first voltage and the second voltage, (iv) determine a target voltage based on the third voltage, and (v) control the converter such that the voltage becomes equal to the target voltage.

According to the electric vehicle as described above, the converter is controlled so as to achieve the target voltage that appropriately takes account of the first voltage and the second voltage with suitable weights given to the first voltage and the second voltage. It is thus possible to curb reduction of the efficiency of the electric system, and also curb or reduce deterioration of the driveability.

Also, in the electric vehicle as described above, the electronic control unit may be configured to set the weights such that the third voltage becomes equal to a value that is closer to the first voltage when a running load is equal to or larger than a predetermined value, and the third voltage becomes equal to a value that is closer to the second voltage when the running load is smaller than the predetermined value.

With the electric vehicle configured as described above, when the running load is large, the third voltage (target voltage) is set to be close to the first set voltage, so that the user request for running the vehicle at a high load can be met. On the other hand, when the running load is small, the third voltage (target voltage) is set to be close to the second set voltage commensurate with operating conditions of the electric motor, so that the efficiency of the electric system is less likely or unlikely to be reduced.

Further, in the electric vehicle as described above, the transmission may be a plural-speed transmission having a plurality of gear positions. Hysteresis may be provided between a first shift line and a second shift line. The first shift line indicates an upshift of the plural-speed transmission from a first-speed gear position to a second-speed gear position, and the second shift line indicates a downshift of the plural-speed transmission from the second-speed gear position to the first-speed gear position. The electronic control unit may be configured to determine a target voltage regulated by the converter based on a set voltage that is prepared in advance, when the first quantity of state and the second quantity of state are included in a region of the hysteresis.

With the electric vehicle configured as described above, when the transmission is predicted to be shifted up or down soon, the target voltage is determined based on the set voltage prepared in advance. Thus, rapid fluctuations in the target voltage due to rapid changes in the operating point of the electric motor caused by shifting are suppressed or reduced. Accordingly, the target voltage at the time of shifting is stabilized, and, consequently, deterioration of the driveability at the time of shifting can be curbed.

Also, in the electric vehicle as described above, the first quantity of state may be one of torque of the output shaft of the transmission, vehicle driving force, and an accelerator pedal stroke. The second quantity of state may be one of a rotational speed of the output shaft of the transmission and a vehicle speed.

According to the electric vehicle as described above, the target voltage of the converter is stabilized, and, consequently, deterioration of the driveability can be curbed.

According to this invention, in the electric vehicle including the converter that regulates the voltage supplied to the drive unit that drives the electric motor, deterioration of the driveability due to rapid changes in the operating point of the electric motor can be curbed, and reduction of the efficiency of the electric system can be curbed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
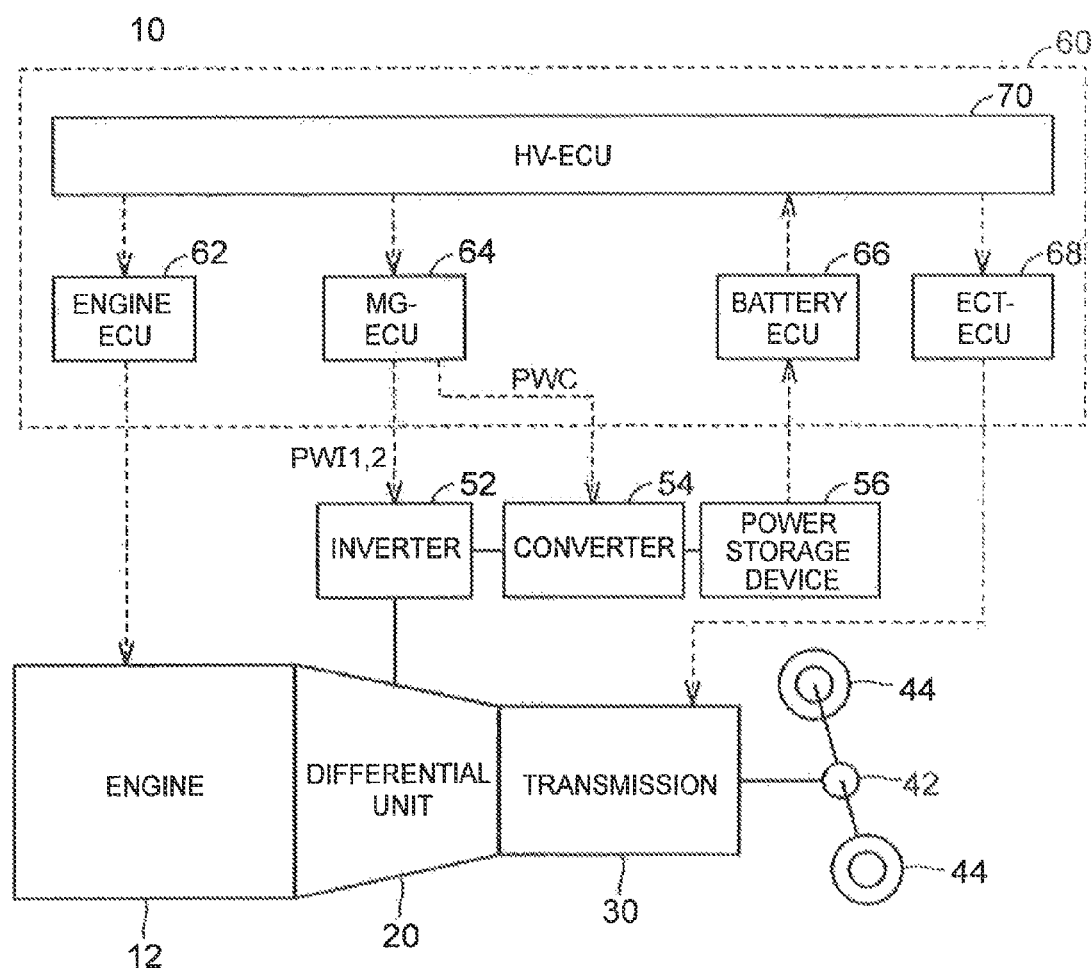
FIG. 1 is a view showing the overall configuration of a hybrid vehicle illustrated as one example of electric vehicle according to a first embodiment of the invention.

Some embodiments of the invention will be described in detail with reference to the drawings. While three embodiments will be described, the configurations or arrangements described in the respective embodiments are supposed to be combined as appropriate, from the time of filing of this application. In the drawings, the same reference numerals are assigned to the same or corresponding portions or elements, of which explanation will not be repeated.

The overall configuration of a vehicle according to a first embodiment of the invention will be described. FIG. 1 shows the overall configuration of a hybrid vehicle 10 illustrated as one example of electric vehicle according to the first embodiment of this invention. Referring to FIG. 1, the hybrid vehicle 10 includes an engine 12, a differential unit 20, a transmission 30, a differential gear device 42, and drive wheels 44. The hybrid vehicle 10 further includes an inverter 52, a converter 54, a power storage device 56, and a controller 60.

The engine 12 is an internal combustion engine that generates power by converting thermal energy produced by combustion of fuel into kinetic energy of a moving object, such as a piston or a rotor. The differential unit 20 is coupled to the engine 12. The differential unit 20 includes motor-generators driven by the inverter 52, and a power split device that distributes the output of the engine 12 to a transmission member connected to the transmission 30, and one of the motor-generators. The configuration of the differential unit 20 will be described later.

The transmission 30 is coupled to the differential unit 20, and is configured such that the ratio (speed ratio) of the rotational speed of the transmission member (an input shaft of the transmission 30) connected to the differential unit 20 and the rotational speed of a drive shaft (an output shaft of the transmission 30) connected to the differential gear device 42 can be changed. The transmission 30 is a plural-speed transmission having two or more gear positions, and the speed ratio of the transmission 30 can be changed in a stepwise fashion. The differential gear device 42 is coupled to the output shaft of the transmission 30, and transmits power delivered from the transmission 30 to the drive wheels 44. The configuration of the transmission 30 will also be described later, along with the differential unit 20.

The inverter 52 is controlled by the controller 60, and drives the motor-generators included in the differential unit 20. The inverter 52 consists of bridge circuits each including power semiconductor switching devices for three phases, for example.

The converter 54 is electrically connected between the inverter 52 and the power storage device 56. The converter 54 is controlled by the controller 60, and regulates voltage supplied to the inverter 52. More specifically, the converter 54 raises or boosts the voltage supplied to the inverter 52, to a higher level than the voltage of the power storage device 56. For example, the converter 54 consists of a boost chopper circuit of a current reversible type.

The power storage device 56 is a rechargeable DC power supply, and typically consists of a secondary battery, such as a lithium-ion battery or a nickel hydride battery. The power storage device 56 may also consist of a power storage element, such as an electric double layer capacitor, in place of the secondary battery.

The controller 60 is an electronic control unit which includes an engine ECU (Electronic Control Unit) 62, MG-ECU 64, battery ECU 66, ECT-ECU 68, and an HV-ECU 70. Each of the ECUs includes a CPU (Central Processing Unit), a storage device, an input/output buffer, etc. (all of which are not shown), and performs certain control. The control performed by each ECU is not limited to processing by software, but may be processing by an exclusive hardware (electronic circuit).

The engine ECU 62 produces a throttle signal, ignition signal, etc. for driving the engine 12, based on an engine torque command, etc. received from the HV-ECU 70, and outputs the signals thus produced to the engine 12.

The MG-ECU 64 produces a control signal for driving the converter 54, based on a voltage command value indicative of a target voltage of the converter 54 (a target value of input voltage of the inverter 52), which value is received from the HV-ECU 70. The MG-ECU 64 then outputs the control signal thus produced to the converter 54. Also, the MG-ECU 64 produces a control signal for driving the inverter 52, based on a torque command, etc. of each of the motor-generators included in the differential unit 20, which command is received from the HV-ECU 70. The MG-ECU 64 then outputs the control signal thus produced to the inverter 52.

The battery ECU 66 estimates the state of charge of the power storage device 56 (which is indicated by an SOC value representing the current amount of electricity or electric power stored therein relative to the fully charged state in percentage), based on the voltage and/or current of the power storage device 56, and outputs the estimated value to the HV-ECU 70. The ECT-ECU 68 produces a hydraulic command value for controlling the transmission 30, based on a torque capacity command, etc. received from the HV-ECU 70, and outputs the hydraulic command value thus produced to the transmission 30.

The HV-ECU 70 receives detected signals of various sensors, and produce various commands for controlling each device of the hybrid vehicle 10. As main commands, the HV-ECU 70 produces various commands for running the vehicle while controlling the engine 12 and the differential unit 20 into desired conditions, based on the amount of operation of the accelerator pedal, vehicle speed, and so forth, and produces various commands for controlling the transmission 30 into a desired speed changing state. Also, the HV-ECU 70 produces a voltage command value (target voltage) indicative of a target value of voltage regulated by the converter 54 and supplied to the inverter 52.

Figure 2:
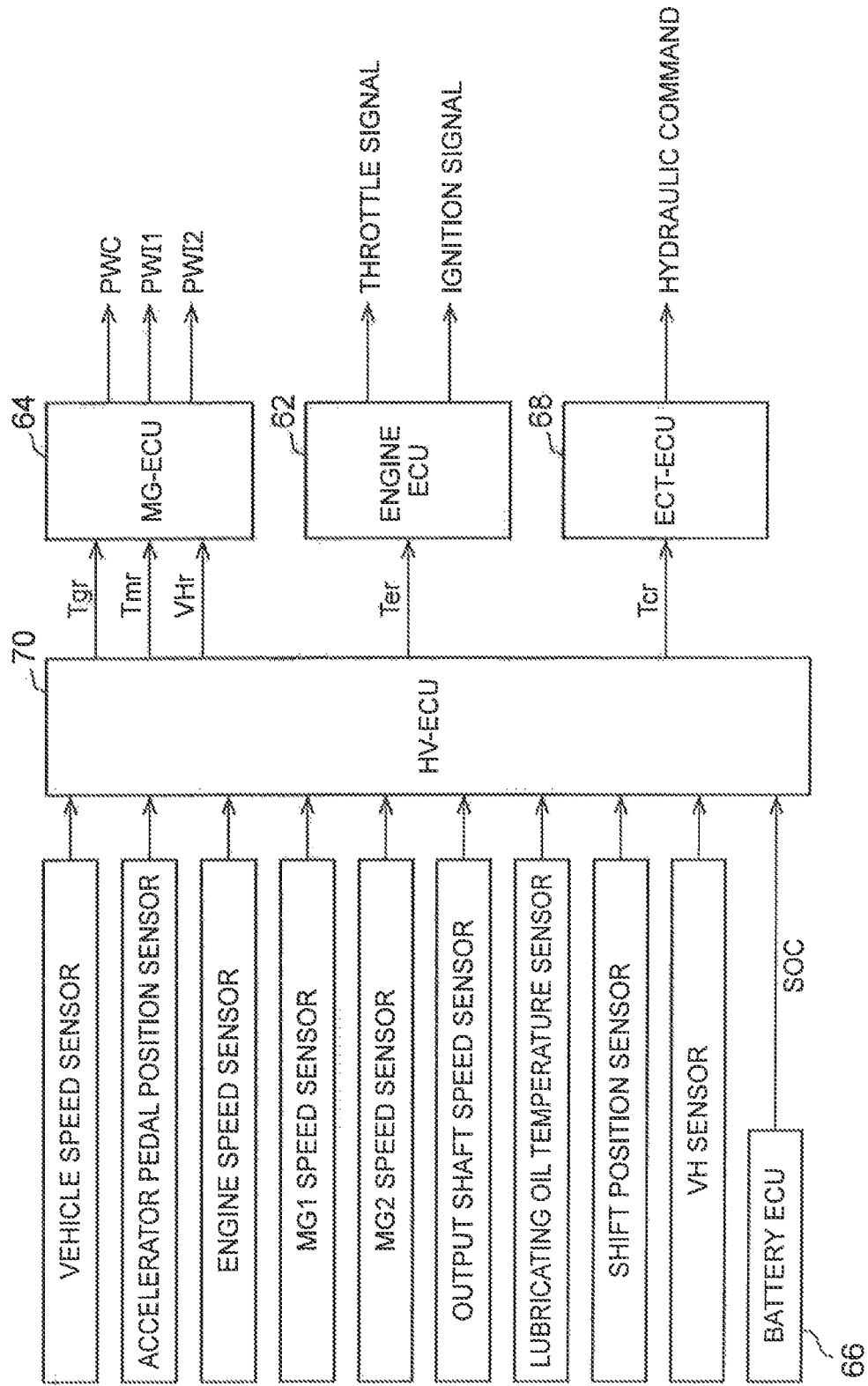
FIG. 2 is a view showing main signals and commands that are received by or generated from a controller shown in FIG. 1.

FIG. 2 is a view showing main signals and commands received by and generated from the controller 60 shown in FIG. 1. Referring to FIG. 2, the HV-ECU 70 receives a signal from a vehicle speed sensor that detects the speed of the hybrid vehicle 10, a signal from an accelerator pedal position sensor that detects the amount of operation of the accelerator pedal, and a signal from an engine speed sensor that detects the rotational speed of the engine 12. Also, the HV-ECU 70 further receives a signal from an MG1 speed sensor for detecting the rotational speed of a motor-generator MG1 (which will be described later) included in the differential unit 20, a signal from an MG2 speed sensor for detecting the rotational speed of a motor-generator MG2 (which will be described later) included in the differential unit 20, and a signal from an output shaft speed sensor for detecting the rotational speed of the output shaft of the transmission 30.

Further, the HV-ECU 70 further includes a signal from a lubricating oil temperature sensor that detects the temperature of the lubricating oil of the differential unit 20 and the transmission 30, a signal from a shift position sensor that detects a shift position selected with (indicated by) a shift lever, and a signal from a VH sensor that detects voltage VH (input voltage of the inverter 52) regulated by the converter 54. Further, the HV-ECU 70 receives a signal indicative of the SOC value of the power storage device 56, from the battery ECU 66.

Then, the HV-ECU 70 produces an engine torque command value Ter indicative of a target value of output torque of the engine 12, based on the signals as described above, and outputs the command value Ter to the engine ECU 62. Also, the HV-ECU 70 produces torque command values Tgr, Tmr of the motor-generators MG1, MG2 of the differential unit 20, and outputs the command values Tgr, Tmr to the MG-ECU 64. Also, the HV-ECU 70 determines the gear position of the transmission 30 according to a predetermined shift map, produces a torque capacity command value Ter for establishing the gear position, and outputs the command value Ter to the ECT-ECU 68.

Further, the HV-ECU 70 determines a target voltage VHr indicative of a target value of the voltage VH regulated by the converter 54, and outputs the target voltage VHr to the MG-ECU 64. More specifically, the HV-ECU 70 calculates output shaft torque of the transmission 30, based on output shaft torque of the differential unit 20 (corresponding to input shaft torque of the transmission 30) that can be calculated from the engine torque command value Ter and the torque command values Tgr, Tmr of the motor-generators MG1, MG2, and the speed ratio of the transmission 30. Then, the HV-ECU 70 determines the above-indicated target voltage VHr, using a map or relational expression(s) prepared in advance, based on the output shaft torque of the transmission 30, and the rotational speed of the output shaft of the transmission 30 detected by the output shaft speed sensor. The manner of determining the target voltage VHr will be described later.

The engine ECU 62 that receives the engine torque command value Ter from the HV-ECU 70 produces the throttle signal, ignition signal, etc. for driving the engine 12, and outputs the signals to the engine 12. The MG-ECU 64 produces signals PWI1, PWI2 for driving the motor-generators MG1, MG2 by means of the inverter 52, based on the torque command values Tgr, Tmr received from the HV-ECU 70, and outputs the signals to the inverter 52. Also, the MG-ECU 64 produces a signal PWC for controlling the converter 54 so that the voltage VH becomes equal to the target voltage VHr, based on the target voltage VHr received from the HV-ECU 70, and outputs the signal PWC to the converter 54. The ECT-ECU 68 produces a hydraulic command value that causes the transmission 30 to have a torque capacity corresponding to the torque capacity command value Tcr, and outputs the command value to the transmission 30.

Figure 3:
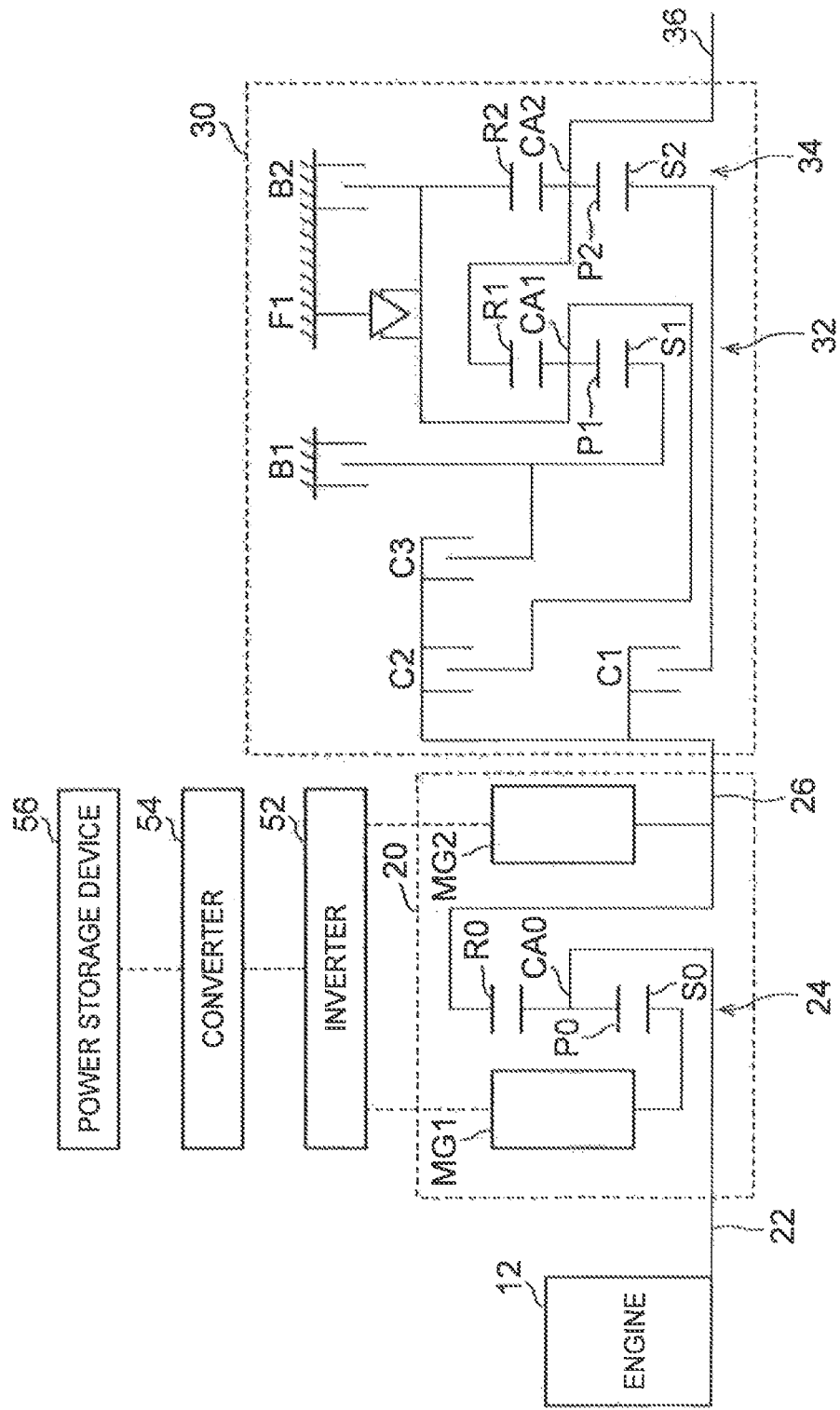
FIG. 3 is a view showing the configuration of a differential unit and a transmission shown in FIG. 1.

(Configuration of Differential Unit and Transmission)
FIG. 3 shows the configuration of the differential unit 20 and the transmission 30 shown in FIG. 1. In the first embodiment, the differential unit 20 and the transmission 30 are configured or arranged symmetrically with respect to the axis hereof; therefore, the lower halves of the differential unit 20 and transmission 30 are not illustrated in FIG. 3.

Referring to FIG. 3, the differential unit 20 includes the motor-generators MG1, MG2, and the power split device 24. Each of the motor-generators MG1, MG2 is an AC electric motor, and is in the form of, for example, a permanent magnet type synchronous electric motor having a rotor in which permanent magnets are embedded. The motor-generators MG1, MG2 are driven by the inverter 52.

The power split device 24 consists of a single-pinion-type planetary gear, and includes a sun gear S0, pinion gears P0, carrier CA0, and a ring gear R0. The carrier CA0 is coupled to the input shaft 22, or the output shaft of the engine 12, and supports the pinion gears P0 such that the gears P0 can rotate about themselves and about the axis of the planetary gear. The sun gear S0 is coupled to a rotary shaft of the motor-generator MG1. The ring gear R0 is coupled to the transmission member 26, and is configured to mesh with the sun gear S0 via the pinion gears P0. A rotary shaft of the motor-generator MG2 is coupled to the transmission member 26. Namely, the ring gear R0 is also coupled to the rotary shaft of the motor-generator MG2.

The power split device 24 functions as a differential device when the sun gear S0, carrier CA0 and the ring gear R0 rotate relative to each other. The respective rotational speeds of the sun gear S0, carrier CA0 and the ring gear R0 are connected with a straight line as shown in a nomographic chart (see FIG. 4). Owing to the differential function of the power split device 24, power generated from the engine 12 is distributed to the sun gear S0 and the ring gear R0. The motor-generator MG1 operates as a generator, using the power distributed to the sun gear S0, and electric power generated by the motor-generator MG1 is supplied to the motor-generator MG2, or stored in the power storage device 56 (FIG. 1). The motor-generator MG1 generates electric power, using the power split by the power split device 24, and the motor-generator MG2 is driven, using the electric power generated by the motor-generator MG1. In this manner, the differential unit 20 functions as a continuously variable transmission.

The transmission 30 includes single-pinion-type planetary gears 32, 34, clutches C1-C3, brakes B1, B2, and a one-way clutch F1. The planetary gear 32 includes a sun gear S1, pinion gears P1, a carrier CA1, and a ring gear R1. The planetary gear 34 includes a sun gear S2, pinion gears P2, a carrier CA2, and a ring gear R2.

Each of the clutches C1-C3 and the brakes B1, B2 is a friction engagement device that is hydraulically operated, and consists of a wet multiple disc clutch or brake in which a plurality of stacked sheets of friction plates are hydraulically pressed, or a band brake that has a band wound around an outer circumferential surface of a rotating drum and is operable when one end of the band is hydraulically pulled tightly, or the like. The one-way clutch F1 supports the carrier CA1 and the ring gear R2 coupled to each other so as to permit them to rotate in one direction and inhibit them from rotating in the other direction. With this arrangement, each of the clutches C1-C3 and the brakes B1, B2 is selectively engaged or released, so that a selected one of the 1st-speed gear position through 4th-speed gear position and a rear-drive gear position is formed in the transmission 30. When all of the engagement devices of the clutches C1-C3 and brakes B1, B2 are placed in the released states, a neutral condition (a condition in which power transmission is cut off) can be formed.

The differential unit 20 and the transmission 30 are coupled by the transmission member 26. The output shaft 36 coupled to the carrier CA2 of the planetary gear 34 is coupled to the differential gear device 42 (FIG. 1).

Figure 4:
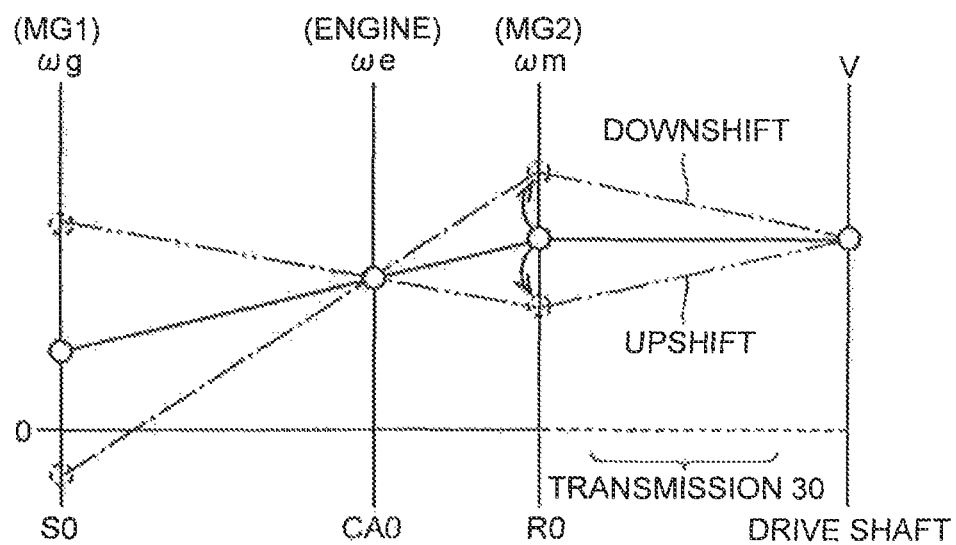
FIG. 4 is a nomographic chart of a power split device, showing changes in rotational speeds of its constituent elements at the time of shifting of the transmission shown in FIG. 1.

FIG. 4 is a nomographic chart of the power split device 24 showing changes in the rotational speeds at the time of shifting of the transmission 30. Referring to FIG. 4, the rotational speed V of the drive shaft (the output shaft of the transmission 30) is constrained by rotation of the drive wheels; therefore, the rotational speed V of the drive shaft hardly changes before and after shifting (downshift or upshift). Accordingly, at the time of downshift (when the speed ratio is increased), the rotational speed of the input shaft of the transmission 30, namely, the rotational speed ωm of the motor-generator MG2 is increased, as indicated by a one-dot chain line in FIG. 4. On the other hand, at the time of upshift (when the speed ratio is reduced), the rotational speed ωm of the motor-generator MG2 is reduced, as indicated by a two-dot chain line in FIG. 4.

The transmission 30 is provided in a power transmission path between the rotary shaft of the motor-generator MG2 and the drive shaft (drive wheels). In the hybrid vehicle 10 according to this embodiment, the operating point (rotational speed and torque) of the motor-generator MG2 rapidly changes before and after shifting of the transmission 30, as described above (as shown in FIG. 4, the operating point of the motor-generator MG1 also rapidly changes). In this case, if the target voltage VHr of the voltage VH supplied to the inverter 52 that drives the motor-generators MG1, MG2 is determined based on the operating points of the motor-generators MG1, MG2, the target voltage VHr may not follow rapid changes of the operating points of the motor-generators MG1, MG2, or the voltage VH may not follow the target voltage VHr. As a result, the motor-generators MG1, MG2 may be temporarily unable to produce desired torque since the voltage VH supplied to the inverter 52 is insufficient, and the driveability may deteriorate.

Thus, in the hybrid vehicle 10 according to this embodiment, the target voltage VHr is not determined based on the operating points of the motor-generators MG1, MG2, but the target voltage VHr is determined based on the torque and rotational speed of the output shaft (drive shaft) of the transmission 30. Thus, rapid fluctuations in the target voltage VHr due to rapid changes in the operating points of the motor-generators MG1, MG2 can be curbed or reduced, and the target voltage VHr can be set to a value that reflects a running load.

Figure 5:
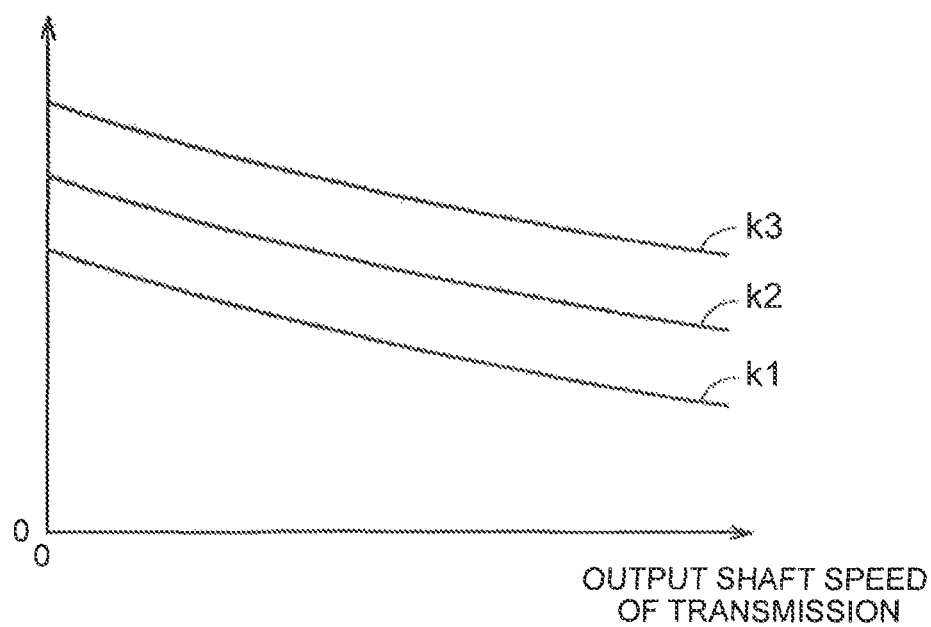
FIG. 5 is a view showing one example of setting of a target voltage according to the first embodiment.

The target voltage VHr is set to a value that is higher as the torque and rotational speed of the output shaft of the transmission 30 are greater. FIG. 5 shows one example of setting of the target voltage VHr in the first embodiment. Referring to FIG. 5, the horizontal axis indicates the rotational speed of the output shaft of the transmission 30, and the vertical axis indicates the torque of the output shaft of the transmission 30. The torque of the output shaft of the transmission 30 is a command value representing target torque, and can be calculated based on the output shaft torque of the differential unit 20 (corresponding to the input shaft torque of the transmission 30) calculated from the engine torque command value Ter and the torque command values Tgr, Tmr of the motor-generators MG1, MG2, and the speed ratio of the transmission 30.

In FIG. 5, curve k1 is a level curve on which the target voltage VHr is set to V1, for example. Curve k2 is a level curve on which the target voltage VHr is set to V2, for example, and V2 is larger than V1. Curve k3 is a level curve on which the target voltage VHr is set to V3, for example, and V3 is larger than V2. Thus, the target voltage VHr is set so as to be higher as the torque and rotational speed of the output shaft of the transmission 30 are greater, so that the torques of the motor-generators MG1, MG2 and that of the output shaft of the transmission 30 are less likely or unlikely to be insufficient.

Figure 6:
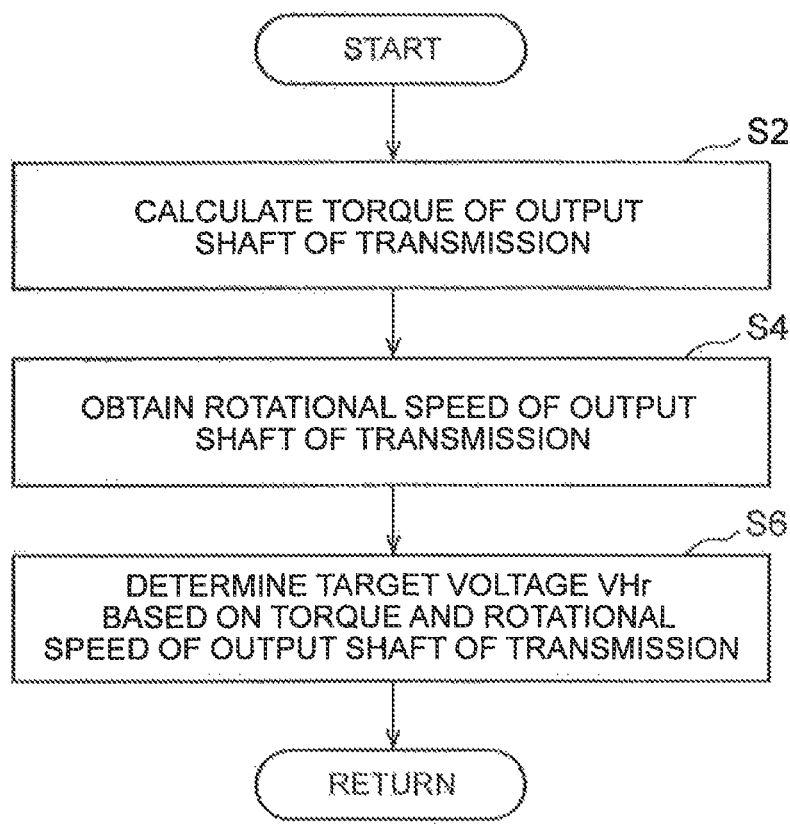
FIG. 6 is a flowchart useful for explaining a method of setting the target voltage according to the first embodiment.

FIG. 6 is a flowchart useful for explaining a method of setting the target voltage according to this embodiment. Referring to FIG. 6, the HV-ECU 70 (FIG. 1, FIG. 2) calculates torque of the output shaft of the transmission 30 (step S2). As described above, the torque of the output shaft of the transmission 30 can be calculated based on the output shaft torque of the differential unit 20 calculated from the engine torque command value Ter and the torque command values Tgr, Tmr of the motor-generators MG1, MG2, and the speed ratio of the transmission 30.

Then, the HV-ECU 70 obtains the rotational speed of the output shaft of the transmission 30 from the output shaft speed sensor (step S4). Then, the HV-ECU 70 sets a target voltage VHr, using the relationship (map or relational expression) shown in FIG. 5, based on the torque of the output shaft of the transmission 30 calculated in step S2, and the rotational speed of the output shaft of the transmission 30 obtained in step S4.

As described above, in the first embodiment, the target voltage VHr of the converter 54 is determined based on the torque and rotational speed of the output shaft of the transmission 30; therefore, rapid fluctuations in the target voltage VHr due to rapid changes in the operating points of the motor-generators MG1, MG2 are curbed or reduced. Thus, according to the first embodiment, the target voltage VHr is stabilized, and, consequently, deterioration of the driveability can be reduced.

Next, a second embodiment of the invention will be described. In the first embodiment as described above, the target voltage VHr is determined based on the torque and rotational speed of the output shaft of the transmission 30; therefore, the efficiency of an electric system constituted by the converter 54, inverter 52 and the motor-generators MG1, MG2 may be reduced. Namely, from the viewpoint of efficient operation of the electric system, it is preferable to determine the target voltage VHr based on the operating points of the motor-generators MG1, MG2 driven by the inverter 52 that receives the voltage VH. However, if the target voltage is set based on the operating points of the motor-generators MG1, MG2 alone, the driveability may deteriorate due to rapid changes in the operating points of the motor-generators MG1, MG2, as described above.

Thus, in the second embodiment, a first set voltage VH1 is determined based on the torque and rotational speed of the output shaft of the transmission 30, and a second set voltage VH2 is determined based on the operating points of the motor-generators MG1, MG2. Then, the target voltage VHr is determined based on the first set voltage VH1 and the second set voltage VH2. It is thus possible to set the target voltage VHr in view of the efficiency of the electric system, while curbing deterioration of the driveability.

Figure 7:
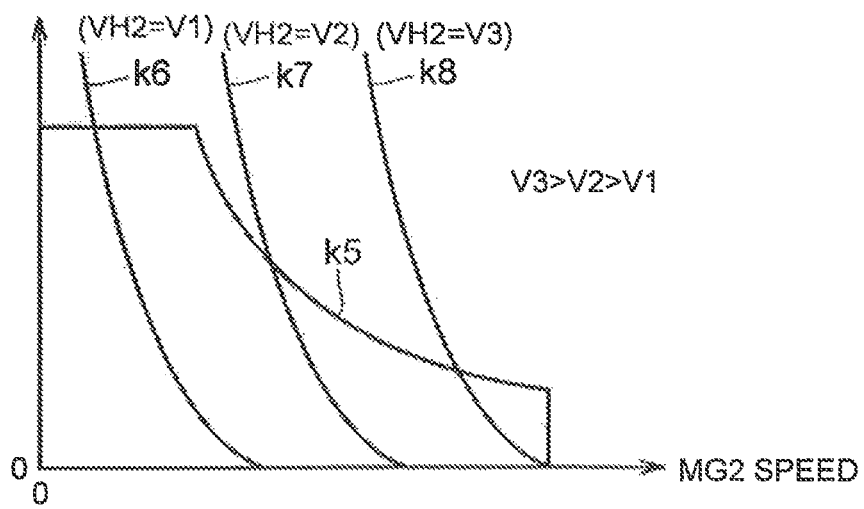
FIG. 7 is a view showing one example of setting of a second set voltage based on operating conditions of a motor-generator, in a second embodiment of the invention.

FIG. 7 shows one example of setting of the second set voltage VH2 based on operating conditions of the motor-generator MG2. Referring to FIG. 7, the vertical axis indicates the torque of the motor-generator MG2, and the horizontal axis indicates the rotational speed of the motor-generator MG2. Curve k5 indicates the maximum torque of the motor-generator MG2.

In FIG. 7, curve k6 is a level curve on which the second set voltage VH2 is set to V1. Curve k7 is a level curve on which the second set voltage VH2 is set to V2, and V2 is larger than V1. Curve k8 is a level curve on which the second set voltage VH2 is set to V3, and V3 is larger than V2. The second set voltage VH2 is set to a higher value as the torque and rotational speed of the motor-generator MG2 are greater.

In fact, the second set voltage VH2 is similarly obtained with respect to the motor-generator MG1, and the larger one of the second set voltage VH2 obtained from the operating point of the motor-generator MG2 and the second set voltage VH2 obtained from the operating point of the motor-generator MG1 is employed as the final second set voltage VH2.

The first set voltage VH1 based on the torque and rotational speed of the output shaft of the transmission 30 is set based on the relationship shown in FIG. 5 in the first embodiment. Then, the target voltage VHr is calculated according to the following equation, based on the first set voltage VH1 and the second set voltage VH2.

$$\text{Target Voltage } VHr = W \times VH1 + (1-W) \times VH2 \quad (1)$$

Figure 8:
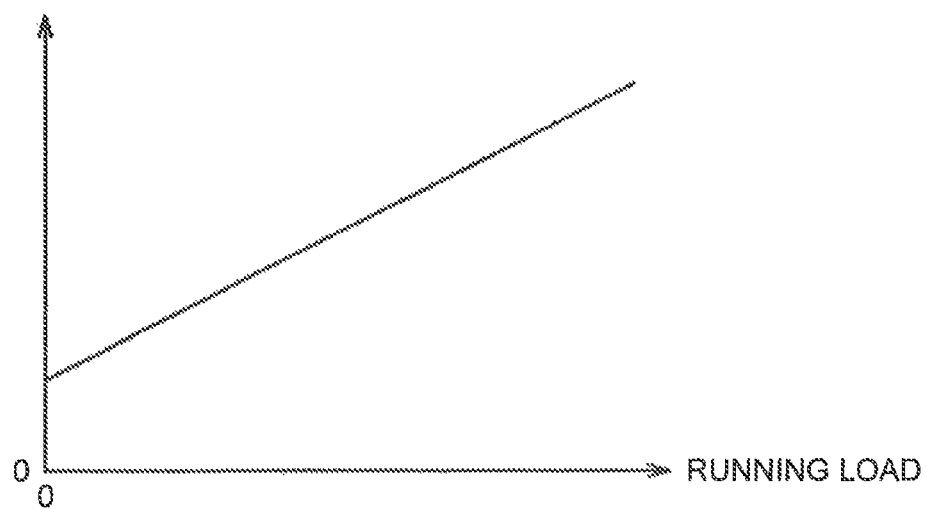
FIG. 8 is a view indicating the relationship between running load and a weighting factor, in the second embodiment.

In this equation, W is a weighting factor that can take a value of 0 to 1, and the weighting factor W is set to a larger value as the running load of the vehicle is larger, as shown in FIG. 8. Namely, when the running load is large, the target voltage VHr is set to be close to the first set voltage VH1 associated with the running load, so as to meet the user request for running the vehicle at a high load. On the other hand, when the running load is small, the target voltage VHr is set to be close to the second set voltage VH2 commensurate with the operating conditions of the motor-generators MG1, MG2, with an emphasis placed on the efficiency of the electric system.

Regarding the running load, the magnitude of the running load may be determined, based on an integrated value of acceleration of acceleration/deceleration, acceleration in the lateral direction, or the like, or a shifting operation when the vehicle has a sequential shifting system, for example.

Figure 9:
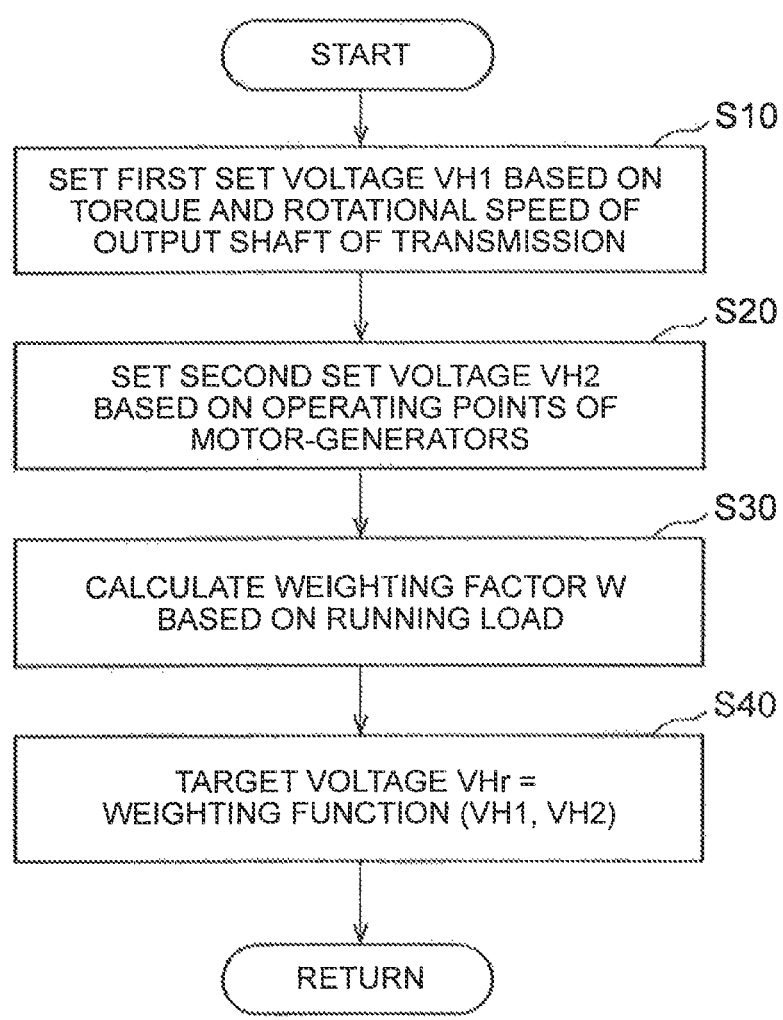
FIG. 9 is a flowchart useful for explaining a method of setting a target voltage according to the second embodiment.

FIG. 9 is a flowchart useful for explaining a method of setting the target voltage VHr according to the second embodiment. Referring to FIG. 9, the HV-ECU 70 (FIG. 1, FIG. 2) sets the first set voltage VH1 using the relationship (map or relational expression) indicated in FIG. 5, based on the torque and rotational speed of the output shaft of the transmission 30 (step S10). The torque of the output shaft of the transmission 30 can be calculated based on the output shaft torque of the differential unit 20 calculated from the engine torque command value Ter and the torque command values Tgr, Tmr of the motor-generators MG1, MG2, and the speed ratio of the transmission 30, as described above. Also, the rotational speed of the output shaft of the transmission 30 is obtained from the output shaft speed sensor.

Then, the HV-ECU 7 sets the second set voltage VH2 using the relationship (map or relationship expression) indicated in FIG. 7, based on the operating points (torques and rotational speeds) of the motor-generators MG1, MG2 (step S20).

Subsequently, the HV-ECU 70 calculates the weighting factor W using the relationship (map or relationship expression) indicated in FIG. 8, based on the running load of the hybrid vehicle 10 (step S30). Then, the HV-ECU 70 calculates the target voltage VHr using the weighting function including the weighting factor W and indicated in the above equation (1), based on the first set voltage set in step S10, and the second set voltage VH2 set in step S20 (step S40).

As described above, according to the second embodiment, the target voltage VHr is determined so as to reflect the second set voltage VH2 based on the operating points (torques and rotational speeds) of the motor-generators MG1, MG2. Therefore, the target voltage VHr can be set in view of the efficiency of the electric system.

According to the second embodiment, when the running load is large, the target voltage VHr is set to be close to the first set voltage VH1 associated with the running mode, so that the user request for running the vehicle at a high load can be met. On the other hand, when the running load is small, the target voltage VHr is set to be close to the second set voltage VH2 commensurate with the operating conditions of the motor-generators MG1, MG2, so that the efficiency of the electric system can be made less likely or unlikely to be reduced.

Next, a third embodiment of the invention will be described. In the above-described second embodiment, when the running load is large, the target voltage VHr is set to be close to the first set voltage VH1 based on the torque and rotational speed of the output torque of the transmission 30. In this case, since the running load is large, the first set voltage VH1 can become high, and the target voltage VHr can also become high. Thus, even if the operating points of the motor-generators MG1, MG2 rapidly change at the time of shifting of the transmission 30, torque shortages are less likely or unlikely to occur to the motor-generators MG1, MG2.

On the other hand, when the running load is not large, the target voltage VHr is set to be close to the second set voltage VH2 based on the operating points of the motor-generators MG1, MG2. Accordingly, if the operating points of the motor-generators MG1, MG2 rapidly change at the time of shifting, torque shortages may occur to the motor-generators MG1, MG2. Thus, in the third embodiment, when the running load is not large, and the transmission 30 is expected to be shifted up or down soon, the target voltage VHr is set to a voltage that is estimated in advance by experiment, or the like. Thus, the possibility of torque shortages of the motor-generators MG1, MG2 at the time of shifting is excluded or eliminated.

Figure 10:
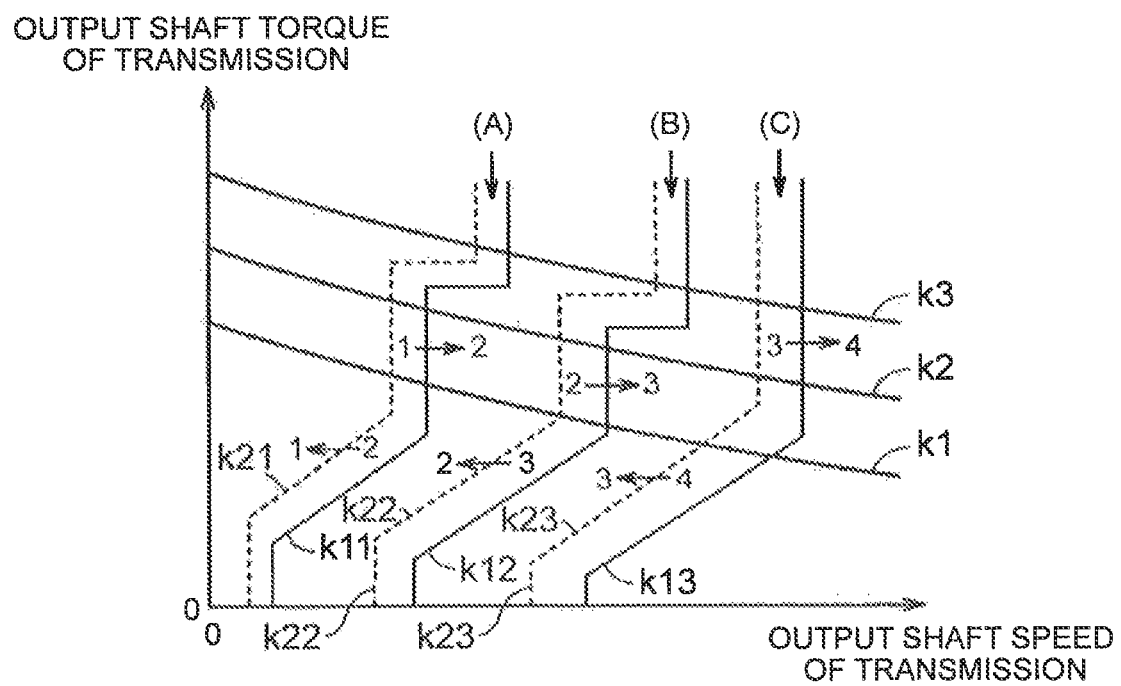
FIG. 10 is a view showing one example of setting of a first set voltage based on torque and rotational speed of the output shaft of the transmission, in a third embodiment of the invention.

FIG. 10 shows one example of setting of the first set voltage VH1 based on the torque and rotational speed of the output shaft of the transmission 30, in the third embodiment. Referring to FIG. 10, shift lines k11-k13, k21-k23 are indicated in FIG. 10, in addition to curves k1-k3 shown in FIG. 5.

The shift line k11 is an upshift line indicating the timing of shifting of the transmission 30 from the first speed to the second speed. The shift line k12 is an upshift line indicating the timing of shifting of the transmission 30 from the second speed to the third speed. The shift line k13 is an upshift line indicating the timing of shifting of the transmission 30 from the third speed to the fourth speed. Also, the shift line k21 is a downshift line indicating the timing of shifting of the transmission 30 from the second speed to the first speed. The shift line k22 is a downshift line indicating the timing of shifting of the transmission 30 from the third speed to the second speed. The shift line k23 is a downshift line indicating the timing of shifting of the transmission 30 from the fourth speed to the third speed. Thus, hysteresis is provided between upshifts and downshifts.

In each of region (A) between the shift lines k11, k21, region (B) between the shift lines k12, k22, and region (C) between the shift lines k13, k23, the first set voltage VH1 is set to a voltage that is estimated in advance by experiment, or the like, in a different manner from setting of voltage based on the curves k1-k3, etc. When the torque and rotational speed of the output shaft of the transmission 30 are included in any of the regions (A), (B) and (C), the transmission 30 is predicted to be shifted up or down soon; therefore, the pre-estimated voltage is set as the first set voltage VH1, as described above.

The target voltage VHr set in each of the regions (A), (B) and (C) may be set to a higher level as the torque of the output shaft is larger, and may be changed according to the distances from the corresponding downshift line and upshift line. Also, setting of the target voltage VHr may be changed, depending on whether the point determined by the torque and rotational speed of the output shaft of the transmission 30 is approaching the downshift line or approaching the upshift line. Also, when the rates of changes of the torque and rotational speed of the output shaft of the transmission 30 are high, the target voltage VHr may be changed while the torque and rotational speed of the output shaft of the transmission 30 lie in a region outside the regions (A), (B) and (C).

Figure 11:
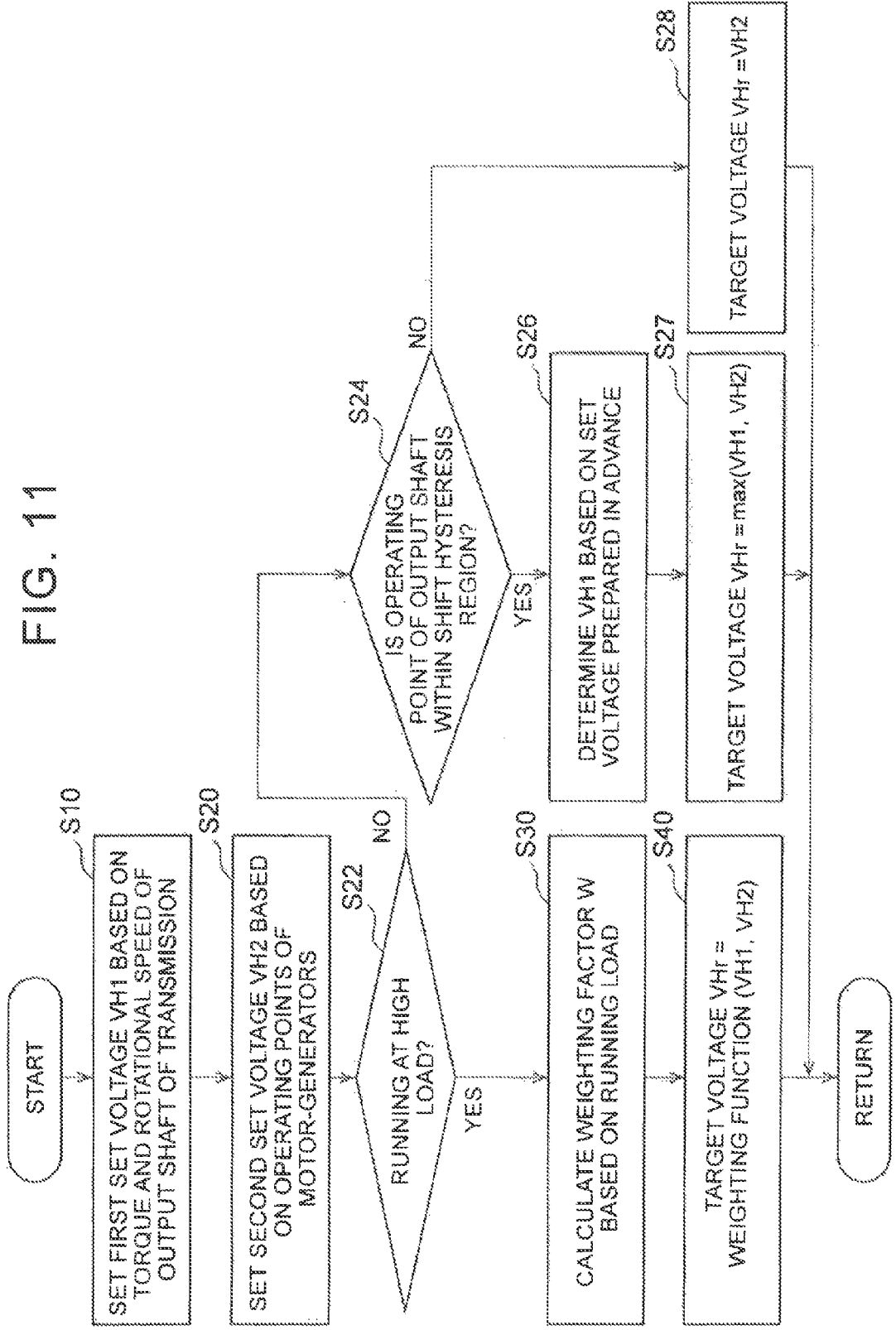
FIG. 11 is a flowchart useful for explaining a method of setting a target voltage according to the third embodiment.

FIG. 11 is a flowchart useful for explaining a method of setting the target voltage VHr in the third embodiment. Referring to FIG. 11, the flowchart further includes steps S22-S28, in addition to the steps included in the flowchart of the second embodiment shown in FIG. 9.

Namely, after the second set voltage VH2 is set based on the operating points (torques and rotational speeds) of the motor-generators MG1, MG2 in step S20, the HV-ECU 70 determines whether the hybrid vehicle 10 runs at a high load (step S22). The running load is calculated, based on an integrated value of acceleration of acceleration/deceleration or acceleration in the lateral direction, or a shifting operation, etc. when the vehicle has a sequential shifting system, for example. When the running load exceeds a predetermined threshold value, it is determined that the vehicle is running at a high load.

If it is determined in step S22 that the vehicle is running at a high load (YES in step S22), the control proceeds to step S30, in which the weighting factor W is calculated based on the running load. If, on the other hand, it is determined in step S22 that the vehicle is not running at a high load (NO in step S22), the HV-ECU 70 determines whether the operating point (torque and rotational speed) of the output shaft of the transmission 30 is included in any of shift hysteresis regions (region (A), (B) or (C) shown in FIG. 10) (step S24).

If it is determined in step S24 that the operating point of the output shaft of the transmission 30 is included in one of the shift hysteresis regions (YES in step S24), the HV-ECU 70 determines the first set voltage VH1 based on the voltage estimated in advance by experiment, or the like, as described above (step S26). Then, the HV-ECU 70 sets the target voltage VHr to the larger one of the first set voltage VH1, and the second set voltage VH2 obtained in step S20 based on the operating points (torques and rotational speeds) of the motor-generators MG1, MG2 (step S27).

If, on the other hand, it is determined in step S24 that the operating point of the output shaft of the transmission 30 lies outside the shift hysteresis regions (NO in step S24), the HV-ECU 70 sets the target voltage VHr to the second set voltage VH2 based on the operating points (torques and rotational speeds) of the motor-generators MG1, MG2 (step S28).

As described above, in the third embodiment, when the transmission 30 is predicted to be shifted up or down soon, the target voltage VHr is determined based on the set voltage prepared in advance. As a result, rapid fluctuations in the target voltage VHr due to rapid changes in the operating points of the motor-generators MG1, MG2 caused by shifting are suppressed or reduced. Thus, according to the third embodiment, the target voltage VHr at the time of shifting is stabilized, and, consequently, deterioration of the driveability at the time of shifting can be curbed or reduced.

In each of the above-described embodiments, the target voltage VHr or the first set voltage VH1 is determined based on the torque and rotational speed of the output shaft of the transmission 30. However, the driving force (that may be a command value or an actual value) of the vehicle, accelerator pedal stroke or angle, or the like, may be used as a quantity of state associated with torque of the output shaft of the transmission 30, in place of the torque of the output shaft of the transmission 30. Also, the vehicle speed, or the like, may be used as a quantity of state associated with the rotational speed of the output shaft of the transmission 30, in place of the rotational speed of the output shaft of the transmission 30.

In each of the above-described embodiments, the hybrid vehicle 10 including the engine 12 and the differential unit 20 including two motor-generators MG1, MG2 has been described as one example of electric vehicle. However, the electric vehicle to which this invention is applied is not limited to the hybrid vehicle constructed as described above. For example, the motor-generator MG2 may be connected to the output shaft of the transmission 30. Further, the electric vehicle to which the invention is applied includes an electric automobile on which no engine is installed. Namely, the electric vehicles according to the invention include vehicles in general each including an electric system including a converter, inverter and a motor(s), and a transmission provided in a power transmission path.

In the above description, at least one of the motor-generators MG1, MG2 corresponds to one example of "electric motor" according to this invention, and the inverter 52 corresponds to one example of "drive unit" according to this invention.

The embodiments disclosed herein are supposed to be combined as appropriate and implemented. It is to be understood that the embodiments disclosed herein are exemplary in all aspects, and not restrictive. The scope of the invention is not determined from the above description of the embodiments, but is defined by the appended claims, and is intended to include all changes within the scope of the invention defined by the claims and within the meaning and range of equivalents thereof.

What is claimed is:

1. An electric vehicle, comprising:
   an electric motor;
   a transmission provided in a power transmission path between a rotary shaft of the electric motor and drive wheels of the electric vehicle;
   a drive unit configured to drive the electric motor;
   a converter configured to regulate a voltage supplied to the drive unit; and
   an electronic control unit configured to
   (i) control the converter, and
   (ii) determine the voltage regulated by the converter, based on a first quantity of state associated with torque of an output shaft of the transmission and a second quantity of state associated with a rotational speed of the output shaft.

2. The electric vehicle according to claim 1, wherein the electronic control unit is configured to set the voltage regulated by the converter to a higher level as a value of the first quantity of state is larger.

3. The electric vehicle according to claim 1, wherein the electronic control unit is configured to set the voltage regulated by the converter to a higher level as a value of the second quantity of state is larger.

4. The electric vehicle according to claim 1, wherein the electronic control unit is configured to
   (i) determine a first voltage indicating a target value of the voltage, based on the first quantity of state and the second quantity of state,
   (ii) determine a second voltage indicating the target value, based on an operating point of the electric motor,
   (iii) determine a target voltage based on the first voltage and the second voltage, and
   (iv) control the converter such that the voltage becomes equal to the target voltage.

5. The electric vehicle according to claim 4, wherein the electronic control unit is configured to determine the target voltage such that the target voltage becomes closer to the first voltage as a running load of the electric vehicle is larger.

6. The electric vehicle according to claim 1, wherein the electronic control unit is configured to
   (i) determine a first voltage indicating a target value of the voltage, based on the first quantity of state and the second quantity of state,
   (ii) determine a second voltage indicating the target value, based on an operating point of the electric motor,
   (iii) determine a third voltage indicating the target value, by giving predetermined weights to the first voltage and the second voltage,
   (iv) determine a target voltage based on the third voltage, and
   (v) control the converter such that the voltage becomes equal to the target voltage.

7. The electric vehicle according to claim 6, wherein the electronic control unit is configured to set the weights such that the third voltage becomes equal to a value that is closer to the first voltage when a running load of the electric vehicle is equal to or larger than a predetermined value, and the third voltage becomes equal to a value that is closer to the second voltage when the running load is smaller than the predetermined value.

8. The electric vehicle according to claim 1, wherein:

the transmission is a plural-speed transmission having a plurality of gear positions;

hysteresis is provided between a first shift line and a second shift line, the first shift line indicates an upshift of the plural-speed transmission from a first-speed gear position to a second-speed gear position, and the second shift line indicates a downshift of the plural-speed transmission from the second-speed gear position to the first-speed gear position; and the electronic control unit is configured to determine a target voltage regulated by the converter based on a set voltage that is prepared in advance, when the first quantity of state and the second quantity of state are included in a region of the hysteresis.

9. The electric vehicle according to claim 1, wherein:

the first quantity of state includes one of torque of the output shaft of the transmission, vehicle driving force, and an accelerator pedal stroke; and the second quantity of state includes one of a rotational speed of the output shaft of the transmission and a vehicle speed.

\* \* \* \* \*